United States Patent [19]
Dutczak

[11] Patent Number: 5,617,779
[45] Date of Patent: Apr. 8, 1997

[54] BARBECUE GRILL SHELF ATTACHMENT

[76] Inventor: Mychajlo Dutczak, 1270 Mackinaw Ave., Calumet City, Ill. 60409

[21] Appl. No.: 691,096

[22] Filed: Aug. 1, 1996

[51] Int. Cl.$^6$ ............................. A47J 37/00; A47J 37/07
[52] U.S. Cl. ........................ 99/450; 99/482; 126/25 R; 126/41 R
[58] Field of Search .................. 99/339, 340, 444–450, 99/482; 126/25 R, 41 R, 37 A, 37 B, 9 R, 9 B

[56] References Cited

U.S. PATENT DOCUMENTS

| | | |
|---|---|---|
| Re. 33,091 | 10/1989 | Schlosser . |
| D. 278,021 | 3/1985 | Schlosser et al. . |
| D. 284,929 | 8/1986 | Schlosser et al. . |
| D. 293,067 | 12/1987 | Stephen et al. . |
| D. 316,355 | 4/1991 | Stephen et al. . |
| D. 327,390 | 6/1992 | Schlosser et al. . |
| 3,391,682 | 7/1968 | King et al. .............. 126/25 R |
| 4,166,413 | 9/1979 | Meszaros ................. 99/393 |
| 4,498,452 | 2/1985 | Schlosser et al. . |
| 4,535,749 | 8/1985 | Schlosser et al. . |
| 4,576,140 | 3/1986 | Schlosser . |
| 4,627,408 | 12/1986 | Schlosser . |
| 4,677,964 | 7/1987 | Lohmeyer et al. . |
| 4,727,853 | 3/1988 | Stephen et al. . |
| 4,777,927 | 10/1988 | Stephen et al. . |
| 4,829,978 | 5/1989 | Schlosser . |
| 4,836,179 | 6/1989 | Schlosser et al. . |
| 4,860,724 | 8/1989 | Schlosser et al. . |
| 4,924,846 | 5/1990 | Peacock et al. . |
| 4,941,817 | 7/1990 | Schlosser . |
| 4,955,125 | 10/1990 | Stephen et al. . |
| 4,955,358 | 9/1990 | Harris et al. .............. 248/188 X |
| 5,016,607 | 5/1991 | Doolittle et al. .......... 126/41 R |
| 5,050,577 | 9/1991 | Baynes et al. . |
| 5,070,776 | 12/1991 | Schlosser et al. . |
| 5,072,718 | 12/1991 | Seal ...................... 126/41 R |
| 5,076,252 | 12/1991 | Schlosser et al. . |
| 5,088,470 | 2/1992 | James, Jr. et al. ........ 126/41 R |
| 5,090,398 | 2/1992 | Raymer et al. ............ 99/449 X |
| 5,104,080 | 4/1992 | Berger .................... 248/250 |
| 5,109,834 | 5/1992 | Collins et al. ............ 126/41 R |
| 5,163,358 | 11/1992 | Hanagan et al. ........... 99/450 X |
| 5,163,359 | 11/1992 | McLane, Sr. .............. 99/447 |
| 5,165,385 | 11/1992 | Doolittle et al. ......... 99/449 X |
| 5,408,985 | 4/1995 | Giebel et al. . |
| 5,452,707 | 9/1995 | Harris et al. . |
| 5,471,916 | 12/1995 | Bird et al. ............... 99/450 X |

OTHER PUBLICATIONS

*1996 Barbecue Grills, Sunbeam*—pp. 6–25, 41, 44, 45, 54 and 55—Copyright 1995 Sunbeam Corporation, 4101 Howard Bush Drive, Neosho, Missouri 64850.
*Go–Anywhere Grills & Charcoal Kettles*—pp. 1–24—Copyright 1993 Weber–Stephen Products Company, 200 East Daniels Road, Palatine, Illinois 60067–6266.
*Spirit Series Gas Barbecues & Genesis Series Gas Barbecues*—pp. 1–12—Copyright 1993 Weber–Stephen Products Company, 200 East Daniels Road, Palatine, Illinois 60067–6266.
*Weber 1996 Catalog & Price List*—pp. 1–18—Copyright 1996 Weber–Stephen Products Company, 250 South Hicks Road, Palatine Illinois 60067–6241.

*Primary Examiner*—Timothy F. Simone
*Attorney, Agent, or Firm*—Richard G. Kinney

[57] ABSTRACT

An attachment for a kettle portable barbecue grill which apparatus serves to provide a fixed tray or shelf extending horizontally from the rear edge of the top of the kettle's bowl. The attachment does not modify the grill per se, and is attached to its exterior at three places: at two spread apart points along the front wheel axle and to the rear handle or rear "lip" of the bowl. The attachment includes a generally U-shaped frame that includes two arm sections that straddle the grill and extend at about 50 degrees to the horizontal from the front axle to which they are affixed. The arms extend upwardly and rearwardly to the rear of the top of the bowl. These arms are then bent to be horizontal and run parallel to one another for a short distance to serve to support the surface of the tray or shelf and are then turned toward one another and united to form a rear handle. The frame includes a cross member at the front of the shelf and means for attaching that member to the rear handle or "lip" of the bowl.

10 Claims, 4 Drawing Sheets

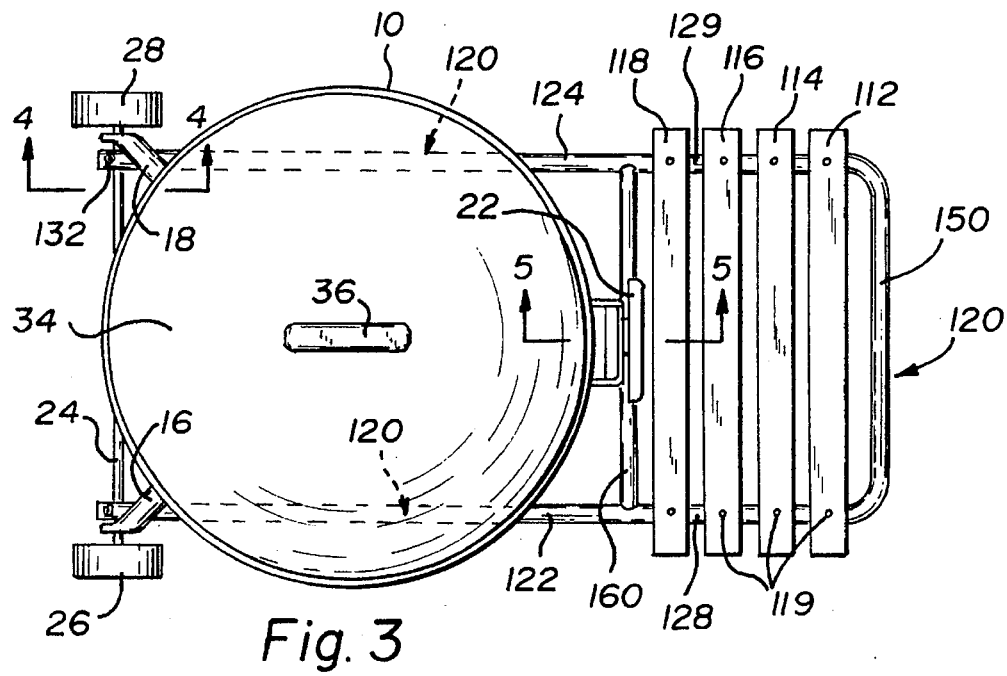
Fig. 3
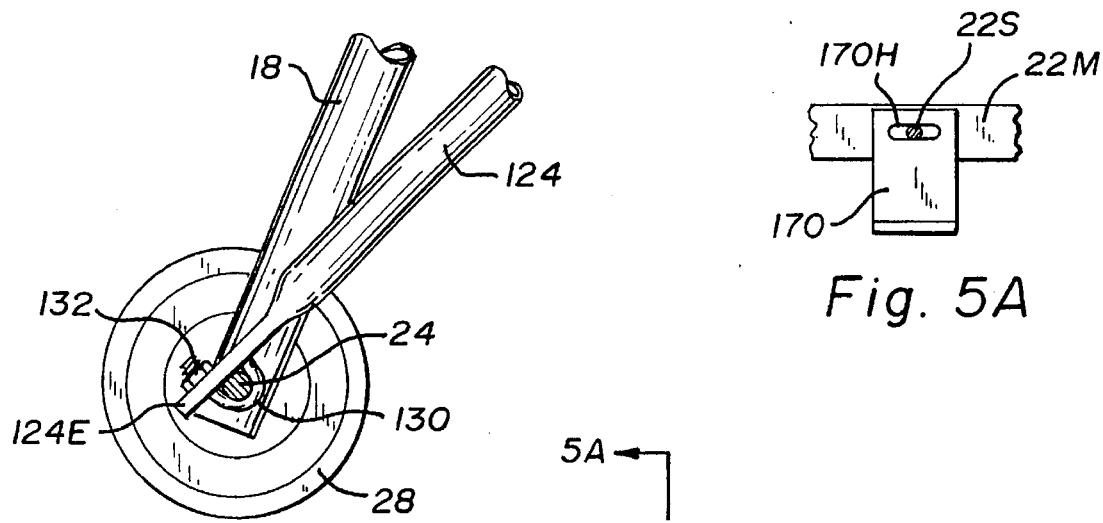
Fig. 4
Fig. 5A
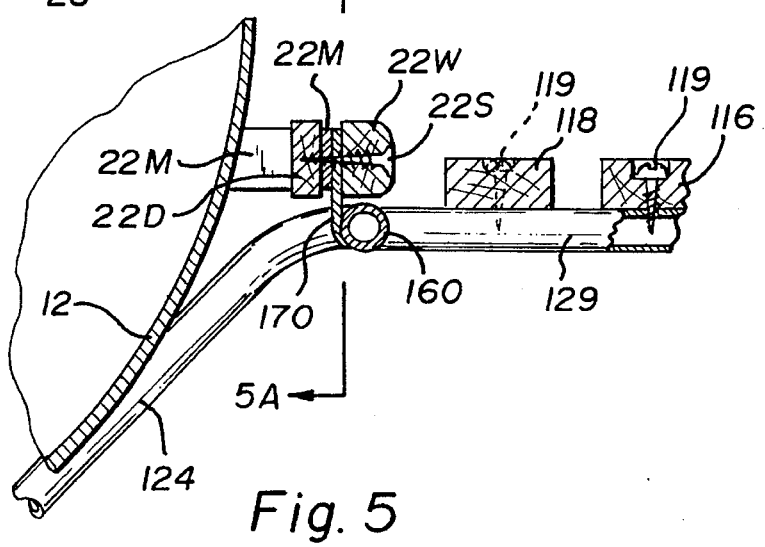
Fig. 5

1

BARBECUE GRILL SHELF ATTACHMENT

SPECIFICATION

1. Field of the Invention

The present invention relates to portable barbecue charcoal grills and is particularly directed to an attachment for providing a tray or shelf adjacent to the grill's bowl or heating chamber.

2. Background of the Invention

Portable charcoal barbecue grills of the kettle or like type, such as those currently manufactured by the Weber-Stephen Products Company and known as Weber kettle grills or those made by the Sunbeam Corporation and sold under the trademarks Sunbeam and Kettle Master are handy and popular with the American consumer.

These grills are relatively light weight and are often equipped with wheels and can be easily rolled about on the users' patio or yard. In many environments of use, however, it would be desirable to have a shelf or tray at approximately the height of the top of the bowl to one side of the bowl for the placement of dishes, food and condiments so these may be readily accessible to the user.

While many grills are provided with such a shelf, most of the portable kettle-type grills do not have such tables.

SUMMARY OF THE INVENTION

The present invention provides such a tray or shelf in the form of an attachment that is easily attached to many existing kettle-type and like portable grills without modifying the grill. This is accomplished by providing a frame that straddles the bowl and is attached at two separated points to the bottom of the front supports for the grill's bowl and extends upward and rearward to be attached to the rear handle or the rear "lip" of the kettle and which frame supports the shelf. By affixing the frame to the front bottom of the grill the frame serves to partly counter-balance the shelf. This construction also allows for a simplified three point attachment: to the rear "lip" or rear handle, and to both sides of the bottom of the front support.

The invention, together with further advantages and features thereof, may best be understood by reference to the following description, taken in connection with the accompanying drawings, in the several figures of which like reference numerals identify like elements.

BRIEF DESCRIPTION OF THE DRAWINGS

FIG. 3 is a top or planar view of the grill and attachment of FIG. 1 and FIG. 2.

FIG. 4 is an enlarged view of a portion of the assembly of FIG. 1–3 as seen from the plane of the line 4—4 in FIG. 3 when looking in the direction of the arrows associated with that line in that figure.

FIG. 5 is an enlarged view of another portion of the assembly of FIG. 1–3 as seen from the plane of the line designated 5—5 in FIG. 3 when looking in the direction of the arrows associated with that line in that figure.

FIG. 5A is a view from the plane of the line 5A—5A in FIG. 5, looking in the direction of the arrows.

DETAILED DESCRIPTION OF THE PREFERRED EMBODIMENTS

Figure 1:
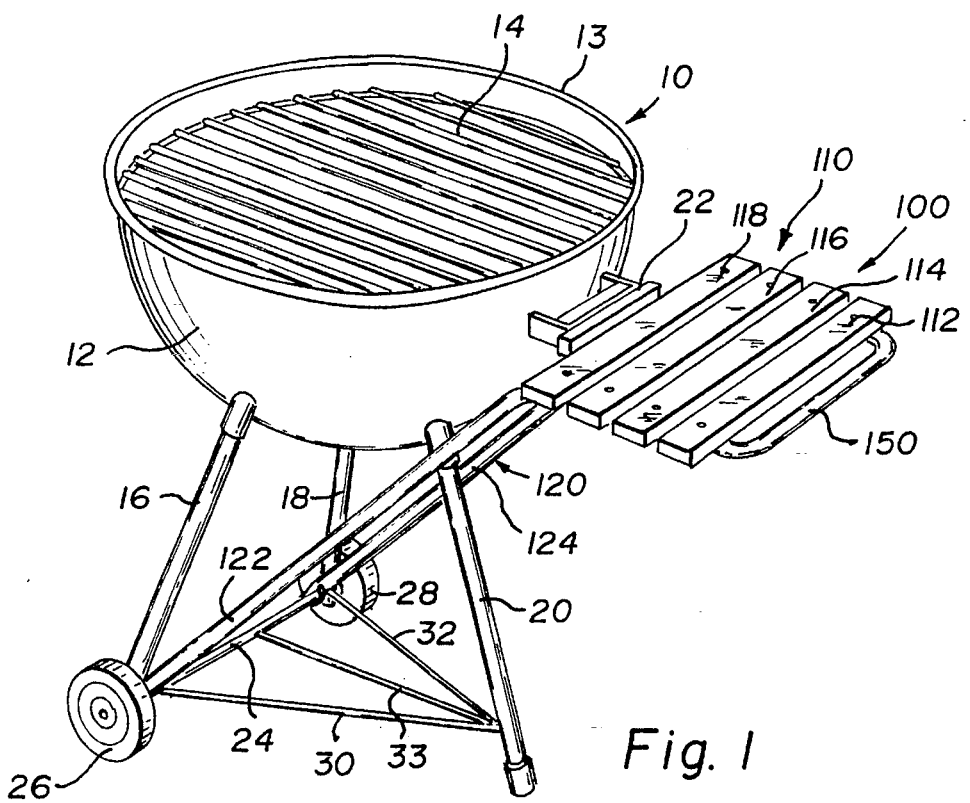
FIG. 1 is a perspective view of a barbecue grill with the shelf or tray attachment of the present invention attached to the grill, with the kettle cover removed.

Referring to FIG. 1 there is depicted a portable kettle grill 10. The particular grill depicted is a Weber model 21001 which has a bowl 12 for receiving charcoal or cooking rock 14 and means for supporting the bowl 12 of a tripod arrangement. This includes a pair of front legs 16 and 18, and a rear leg 20. A handle 22 is also provided at the rear of the grill 10. Although one particular grill is depicted, it should be understood that the present invention may be adapted to many other grills.

We will, for convenience in description here and in the claims, label and refer to the handle side as the "rear" and the opposite wheeled side as the "front". Of course, the bowl 12 being essentially round, this is an arbitrary designation and it should be understood that any consistent system of labeling could be used. Of course, the scope and coverage of the claims do not depend upon any particular system of labeling.

The conventional grill 10 also includes a front fixed axle 24 26 which passes through the legs 16 and 18 and supports two wheels and 28 for rotation on the axle 24. Horizontal struts 30 and 32 span between the rear leg 20 and, respectively, each of the front legs 16 and 18 near their bottoms. These struts, with the axle 24, provide rigidity to the supporting legs 16, 18 and 20. For further rigidity, a rod 33 is provided that is welded to the center of the axle 24 and to leg 20.

Figure 2:
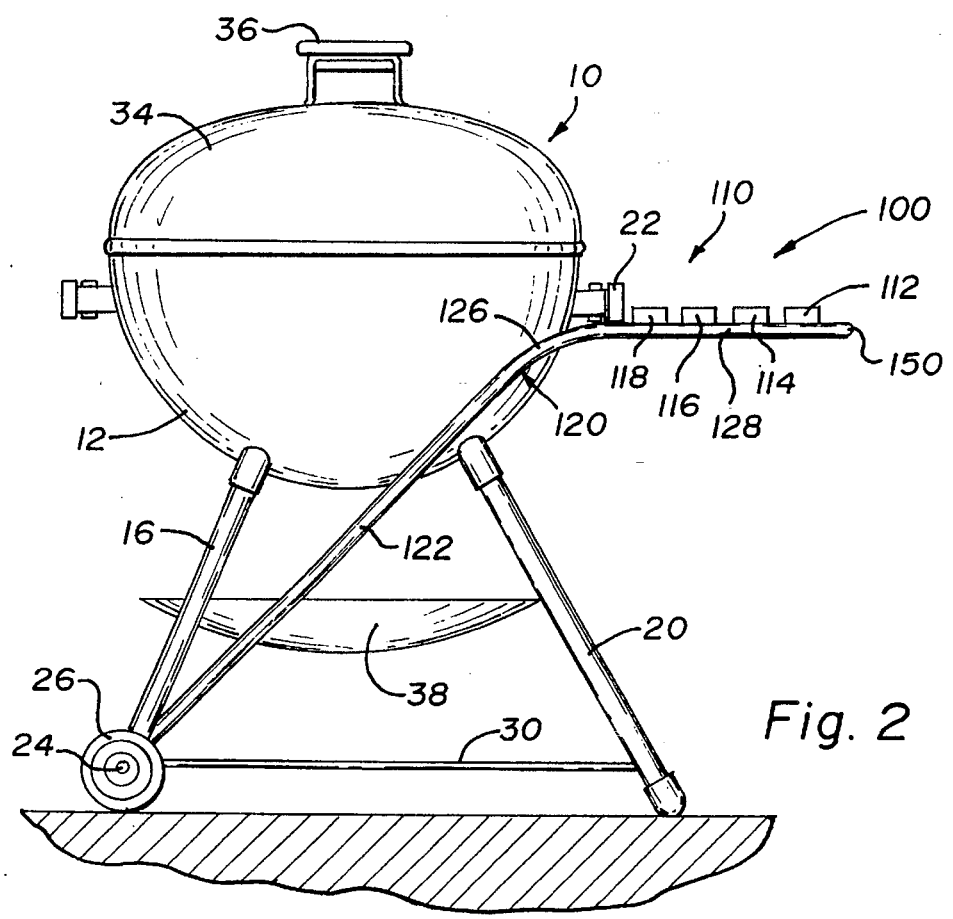
FIG. 2 is a side or elevational view of the grill and attachment of FIG. 1 with the kettle cover in place.

As shown in FIG. 2 and FIG. 3, the grill 10 includes a removable lid 34 for the bowl 12. This lid includes a central handle 36. Also shown in FIG. 2 (but for convenience in showing other parts, is removed from the grill as shown in FIG. 1) is an ash catching dish 38.

As mentioned above, the grill 10 may be entirely conventional and may, in fact, be the grill depicted in U.S. Pat. No. 4,576,140 assigned to Weber-Stephen Products Company. As such, it is not necessary here to describe in detail the construction of this grill. For such a discussion the reader may refer to that patent.

Also depicted in FIG. 1 is a novel attachment 100 constructed and attached in accordance with the principles of the present invention. This attachment may be retrofitted to existing grills such as the grill 10 and serves to provide a tray or shelf 110 adjacent and at about the height of (or slightly below) the rim 13 of the bowl 12. In this case the shelf or tray 110 is made up of four parallel and spaced apart wooden slats 112, 114, 116 and 118. (Wooden slats are commonly used in grill side shelves or trays and no claim to novelty is made from their use. See, for example, the aforementioned U.S. Pat. Nos. 4,924,846 and 5,016,609.)

In accordance with the present invention, the attachment 100 includes a novel frame 120 which, as seen in FIG. 3, is of an overall U-shape with two parallel and spaced apart arms or braces 122 and 124 angled at about 51 degrees to the horizontal. The ends of these arms 122 and 124 are attached to the bottom of grill front support means, as illustrated in FIG. 4 for the arm 124.

The method of attachment for the arm 122 being identical only that of the arm 124 will be here detailed. The end 124E of the arm 124 is preferably flattened and drilled to receive "J" hook fastener 130 secured by a nut 132. The "J" hook fastener 130 secures the end of the arm 124 to the axle 24 just inside the leg 18.

As shown best in FIG. 2, the arms of frame 120 curves at 126 from the approximate 51 degree slant to a horizontal run 128 and 129 to form the support for the slats 112–118. These slats may be secured to the frame 120 by any convenient means such as the screws 119 shown in FIG. 3 and FIG. 5. As shown in FIG. 3, the front sections 128 and 129 continue and turn toward each other to make 90 degree turns in the horizontal plane and merge to form a handle section 150. This new handle 150 functionally replaces the handle 22. As shown, the frame arms 124, 122 sections 128, 129 and 150 are all preferably formed from a single piece of metal tubing. Of course, a number of interlocking tubal sections could also be used. A cross member 160 is brazed to the frame at the front of the tray 110 just under the handle 22 to provide rigidity and to aid in attaching the attachment 100 to the grill 10. Although brazing is preferred, the attachment between member 160 and the frame can also be achieved by other well known processes, including welding and the use of mechanical fasteners.

At the center of the cross member 160, as shown in FIG. 5, is brazed a vertical attachment member 170. (Again, although brazing is preferred, the attachment could be added by welding, mechanical fasteners, or in other manners.) One particular conventional grill rear handle 22 construction is shown in FIG. 5. This handle employs a flat metal strap 22M and a pair of wooden pieces 22W and 22D that "sandwich" the central portion of the metal strap 22M and have aligned pins and holes. These three parts are secured together by a single central screw 22S and the attachment member 170 may be secured by removing the screw and the piece 22W, placing 170 against the metal strap 22M so that the hole in member 170 is aligned and the screw replaced and tightened. (If the old screw does not serve the function, a slightly longer screw may be employed and is provided with the attachment 100.)

Figure 6:
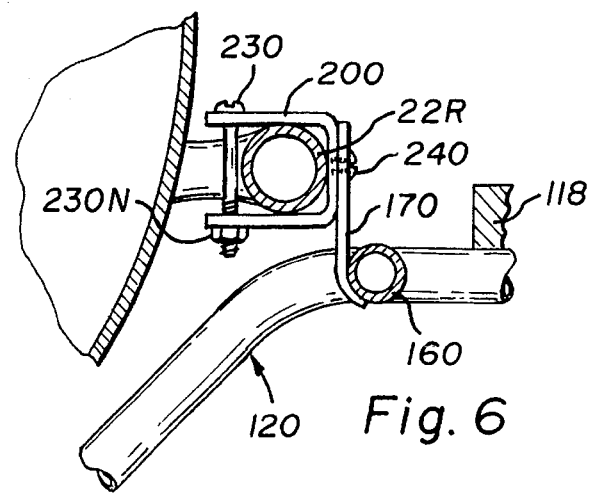
FIG. 6 is a view similar to that of FIG. 5 and 6 illustrating an alternative means for securing the tray attachment to the rear handle.
Figure 7:
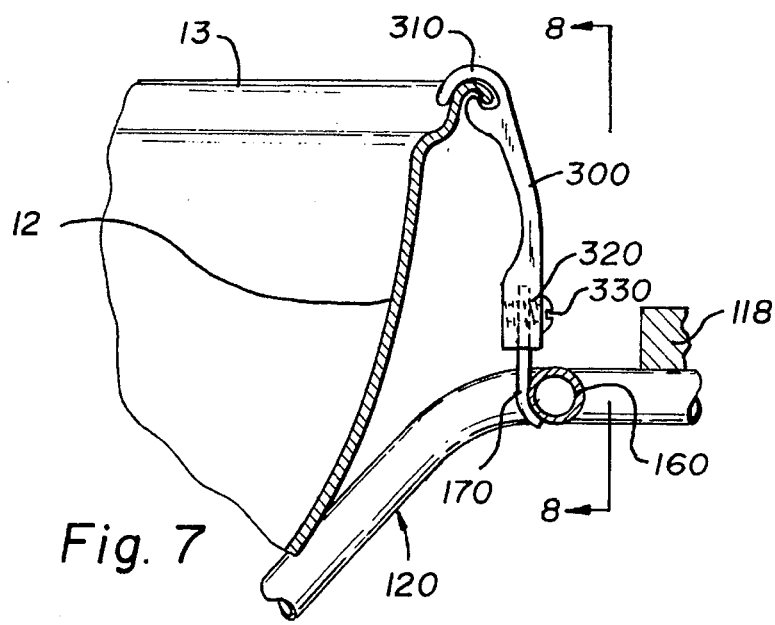
FIG. 7 is a third view similar to that of FIG. 5 and FIG. 6 but illustrates another alternative means for securing the tray attachment to the rear of a bowl of a grill.
Figure 8:
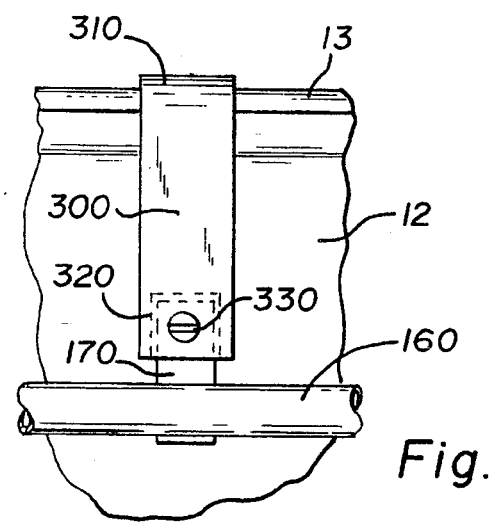
FIG. 8 is a view as seen from the plane of the line 8—8 in FIG. 7 when looking in the direction of the arrows associated with that line.

Now some Weber and other grills similar to the grill 10 have different rear handle constructions. In FIG. 6, an alternative means of attachment to a round handle 22R is shown using a formed metal, three-sided channel section 200. The channel section 200 has a section similar to a C-channel that encompasses three sides of the round handle 22R. Where 200 is slipped over 22R to fasten 200 to the grill using a machine screw 230. Machine screw 230 is passed through two holes, one in the upper and one in the lower ends of the "C" such that the holes are in line. A bolt is held in place by a nut 230N. The 200 is secured to 170 using a machine screw 240 that passes through the hole 190H of the member 170 and is received into a threaded hole in the channel 200. Other grills do not have a rear handle. In this case the member 170 is attached to the rim 13 by means of a rim hooking keeper member 300 shown in FIG. 7 and FIG. 8. This member 300 includes a curved over and under edge 310 sized and shaped to conform with the rim 13 of the bowl 12. The member 300 also include a sleeve portion 320 that slides around and over the member 170 and to which it is secured by a machine screw 330 that passes through the hole 190H of the member 170 and is received in a threaded hole in the sleeve 320.

Of course, other means for securing the frame at its three areas of attachment to the grill may be employed besides those detailed here, and the invention, or at least its broader aspects, should not be restricted to any particular such means.

Prototypes of the inventive attachment have been constructed, tested and proven to perform satisfactorily. For purposes of specificity of disclosure (but not for purpose of limitation) one of these prototype attachments and its method of construction will be here detailed:

The attachment 100 for the prototype had a frame 120 which was made of approximately ten lineal feet of ½ inch electrical conduit, two ¼ inch "J" bolts 130 with matching nuts 132, one 1 and ¼ inches wide by 3 inches long by 1/16 inch thick plate 170 with one 3/16 inch hole drilled in the center of the 1 and ¼ inches width, ½ inch from one end, four slats 112, 114, 116 and 118 were each made of 1 and ⅝ inches wide by 19 and ½ inches long by ⅝ inch thick wood sections with eight No. 10, ¾ inch long sheet metal screws 119 attaching them to the frame 120.

The metal tubing is formed to make the frame 120 of the unit as follows: a 98 and ½ inches long section of conduit is laid out with marks at 1 and ½ inches, 33 inches, 45 and ¼ inches, 53 and ¼ inches, 65 and ½ inches and 97 inches from one end of the tubing. The tubing is then formed into a "U" shape when two 90 degree bends, using a standard conduit bender, are made at the 45 and ¼ inches and 53 and ¼ inches marks. When bent correctly, a "U" shape is made that maintains the tubing centerline in one plane and a straight eight inch tubing section exists between the start of both bends.

Next, the two 28 and ½ inches long legs are offset from the "U" section at the 33 inches and 64 and ½ inches marks. The two bends, using a standard conduit bender, are made to change the tubing direction of both legs, by approximately 51 degrees, in the same direction.

After all required bends have been completed. The bottom two legs are flattened for a length of 1 and ½ inches from their ends. Two 5/16 inch holes are drilled on the center line of the flattened tubing, the wide area, ⅜ inch from the ends for the "J" bolts. A 16 and ⅞ inches long section of ½ inch tubing 160 is then brazed between the metal frame tube legs such that the 16 and ⅞ inches long tube centerline is approximately 11 inches from the centerline of the tube section that makes up the center of the "U" bend. This tube then becomes the middle support tube 160 of the attachment 100. The 1 and ¼ inches wide by 3 inches long by 1/16 inch thick plate with one 3/16 inch hole drilled in the center of the 1 and ¼ inches length is brazed to the center of the middle support tube 160 such that the 1 and ¼ inch length is parallel with the middle support tube length, the 3/16 inch hole centerline is 1 and ¼ inches from the outside tube wall and the plate is pointing perpendicular to the plane made by the "U" bend away from the unit 100 legs.

To complete the attachment 100, the four pieces of 1 and ⅝ inches wide by 19 and ½ inches long by ⅝ inch thick wood 112, 114, 116 and 118 are screwed to the tubing frame starting from the middle support tube to the straight tube section between the end of the second and the beginning of the third bends. The first 1 and ⅝ inch wide board is placed such that the 19 and ½ inch length is centered between the 18 inch wide "U" bend frame, with an even overhang, and the edge of the 1 and ⅝ inches width is one inch from the closest edge of the middle support tube. Two No. 10, ¾ inch long sheet metal screws are then installed through the wood section and into the metal frame approximately one inch from the 19 and ½ inches wood piece ends. A ¾ inch gap is then provided between the first piece and each of the following three pieces to make up the tray area.

The attachment 100 easily attaches to a WEBER brand grill unit in three places. The legs of the unit 100 are connected to the WEBER brand wheel shaft by the two ¼ inch "J" bolts. The third connection is made between the 1 and ¼ inches wide by 2 inches tall by 1 and ¹⁄₁₆ inches thick plate that is fastened to the top center of the attachment 100 middle support tube 160 and is screwed to the metal strap that is welded to the WEBER brand bottom bowl that makes up the handle. For proper installation, the WEBER brand aluminum leg that is not directly connected to the wheel shaft must be located directly below the handle on the bottom bowl prior to installing the tray attachment 100. The tray attachment can be modified to provide the same function on SUNBEAM brand square and other kettle-type barbecue grills.

Figure 9:
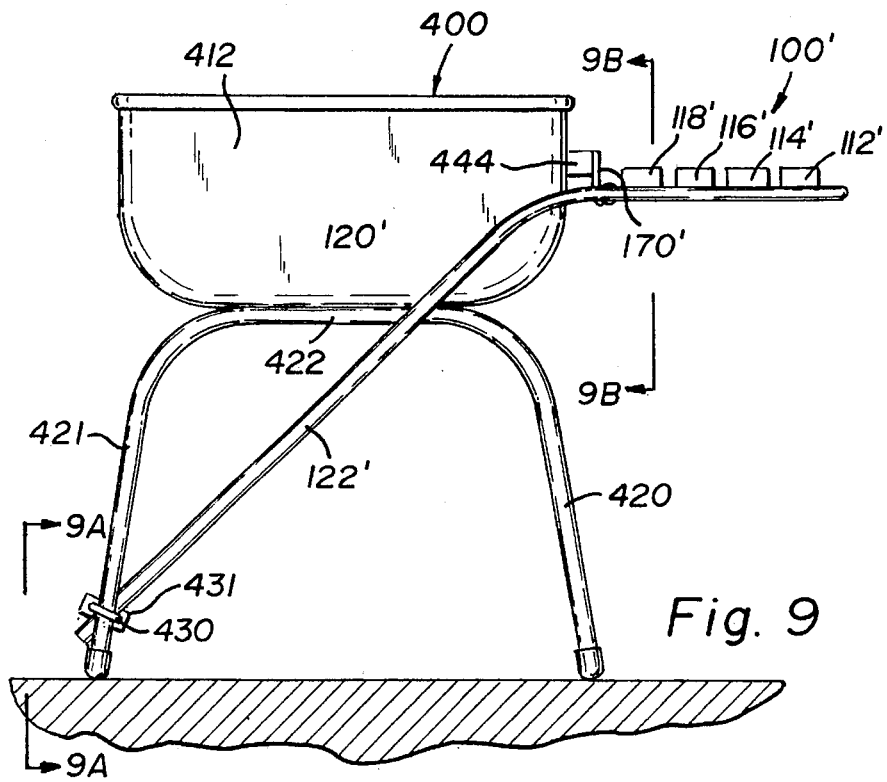
FIG. 9 is a side view of the second type of grill with a modified attachment made and secured to the grill in accordance with the principles of the present invention.
Figure 9A:
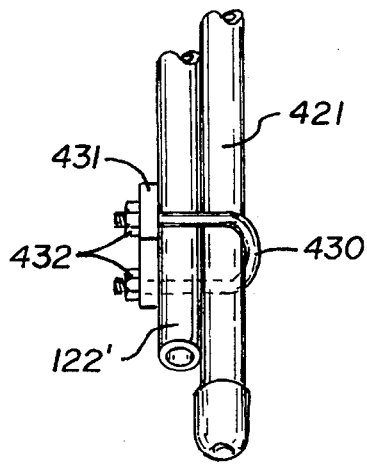
FIG. 9A is a detailed sectional view of a portion of the grill and attachment of FIG. 9 as seen from the plane of the line 9A—9A in FIG. 9 when looking in the direction of the arrows associated with that line.
Figure 9B:
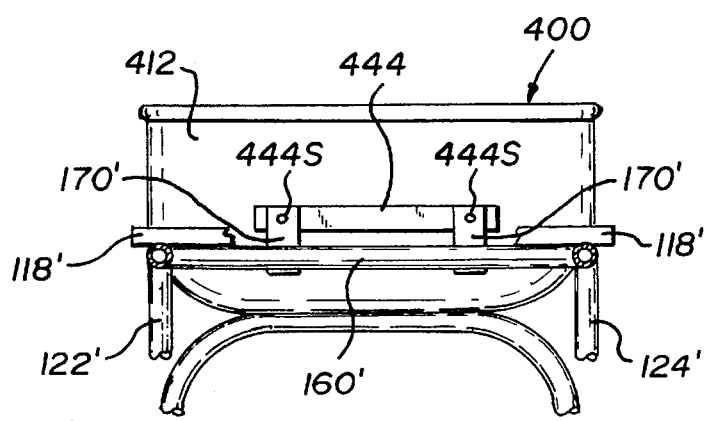
FIG. 9B is a detailed sectional view of a portion of the grill and attachment of FIG. 9 as seen from the plane of the line 9B—9B in FIG. 9 when looking in the direction of the arrows associated with that line.

Referring to FIG. 9—9A and 9B, there is depicted a SUNBEAM brand grill 400. This may be the SUNBEAM Model 80236 or 80536 grill. This grill 400 has a bowl 412 and four legs, such as the legs 420 and 421. The legs of this particular grill are not braced nor interconnected except by the portion 422 affixed to the kettle bowl 412. This particular grill 400 has a handle 444 but no wheels or axle attached as were present with the above described and depicted grill 10 (although these and other models of SUNBEAM grills can be equipped with wheels and axles).

In accordance with the present invention, an attachment 100' having a frame 120' made similarly to that of the prior attachment 100 is provided. This attachment unit 100' includes slats 112', 114', 116' and 118' and a cross member 160'. The attachment 100' is essentially the same as the attachment 100 except for the manner of attachment to the grill 400. The affixation of the leg 122' to the grill's leg 421 is shown in FIG. 9A and of the affixation of the cross member 160' to the grill bowl 412 is shown in FIG. 9B. The attachment of FIG. 9A is accomplished by a U-bolt 430 and flat plate 431 (having two spaced-apart legs) and two nuts 432 as shown instead of the J-bolt unit of the first embodiment.

These are, of course, two front legs such as the leg 421 and each is secured to the legs of the U-shape frame 120 of the attachment 100 in the same manner as shown in FIG. 9A.

The manner of affixing the cross member 160 to the handle 444 is also different and is shown best in FIG. 9B. This is achieved by two vertical, spaced-apart tabs 170 which are brazed to the member 160 and have holes for receiving screws 444S. Otherwise, the construction of the attachment 100 is identical to that of the attachment 100 and this will not be again detailed.

It should now be apparent that novel attachments have been described and depicted which can be retro-fitted to existing grills or may be sold with such grills as part of their original equipment. This attachment provides a useful table or tray, but also provides a handle which, being is further outward from the grill's legs, makes it easier to tilt a grill having wheels so as to more easily roll the grill about. The frame of the attachment also serves to mechanically brace the grill bowl and its legs together and lessen the chance of the grill's legs pulling out of the bowl attachment or becoming "wobbly". It should also be noted that the attachment does not interfere with the users access to the air damper or the ash catcher of the grills to which it is attached, nor does it interfere in any manner with the operation of such damper or ash catchers.

While particular embodiments of the invention have been shown and described, it will be obvious to those in the art that changes and modifications may be made without departing from the invention and, therefore, the aim in the appended claims is to cover all such changes and modifications as fall within the true spirit and scope of the invention.

I claim:

1. In a barbecue grill, the combination of:

a bowl for receiving heat producing means said bowl having a front and a rear and a top;

a front support means connected to the front of said bowl and positioned at the front of the grill and extending from the bottom of the grill to the front of said bowl;

rear support means connected to the rear of said bowl and positioned at the rear of the grill and extending from the bottom of the grill to the rear of the bowl;

a horizontal tray at the rear of the grill at approximately the height of the top of said bowl;

said tray supported by frame means connected to said tray and to said front support means at the front of the grill, near its bottom, which frame means extends rearward and upward to the rear of said bowl wherein it is attached to the rear of said bowl.

2. The barbecue grill of claim 1 wherein: said grill front support means includes a pair of spaced-apart front legs and wherein said frame means is generally U-shaped and has the legs of such U-shaped form straddling said grill with the free ends thereof coupled to alternative ones of said front legs.

3. The barbecue grill of claim 1 wherein:

said bowl has a handle at its rear;

said front support means includes a pair of spaced-apart legs interconnected by a horizontal member near their bottoms with a pair of spaced wheels mounted on said horizontal member, one of said pair of wheels being near one of said pair of legs and the other of said pair of wheels being near to other of said pair of legs;

said frame means includes a generally U-shaped frame having a pair of spaced-apart legs;

means affixing each of said spaced-apart legs at their respective ends to said horizontal member with one leg being affixed thereto near said one of said pair of wheels and the other leg being affixed thereto near said other of said pair of wheels;

said frame means including means for attaching it to said bowl by affixation to said handle;

wherein said frame means and said attached tray are secured to said grill by only the three areas of affixation: to the said horizontal member near each wheel and to said handle.

4. The barbecue grill of claim 3 wherein said frame means includes a handle section at the rear of said tray.

5. A tray or shelf attachment for a portable barbecue grill for providing a tray or shelf at the approximate height of the grill's bowl and at the rear of the grill's bowl, said attachment being for a portable grill having a bowl and at least three legs, including two front legs and at least one rear leg, said attachment comprising:

a frame means for attachment near the bottom of each of said front legs and to the rear of the bowl of said grill and extending horizontally from the rear of the bowl;

shelf or tray flaming means attached to the horizontal extension from the rear of the bowl of said frame means.

6. The attachment of claim 5 wherein:

said frame means includes two legs that are sized and shaped to straddle the grill, one on either side, and are fixed near their ends to one of the grill's front legs.

7. The attachment of claim 6 wherein the grill has a member interconnecting its front legs; and said legs of said frame means are fixed to the respective front legs by being attached to said cross member.

8. The attachment of claim 7 wherein said attachment has means for attaching to the grill at only the bottom of the grill's front legs and the rear of the grill's bowl.

9. The attachment of claim 8 wherein said means for attachment at the rear of the grill's bowl includes means that can be attached to a rear handle of the bowl.

10. The attachment of claim 9 wherein the attachment has a rear handle at the rear of its shelf or tray from which, when attached to a grill, the combination of the grill and attachment may be moved by pulling said attachment handle.

* * * * *

UNITED STATES PATENT AND TRADEMARK OFFICE
CERTIFICATE OF CORRECTION

PATENT NO. : 5,617,779
DATED : April 8, 1997
INVENTOR(S) : Mychajlo Dutczak

It is certified that error appears in the above-identified patent and that said Letters Patent is hereby corrected as shown below:

Col. 2, Line 44, delete "26".

Col. 2, Line 45, insert after "two wheels" and before "and", -- 26 --.

Signed and Sealed this

Eighth Day of July, 1997

Attest:

BRUCE LEHMAN

Attesting Officer

Commissioner of Patents and Trademarks